(12) United States Patent
Ramesh et al.

(10) Patent No.: US 7,342,075 B2
(45) Date of Patent: *Mar. 11, 2008

(54) CARBAMATE FUNCTIONAL ADDITION POLYMERS AND METHOD FOR THEIR PREPARATION

(75) Inventors: Swaminathan Ramesh, Canton, MI (US); Paul J. Harris, West Bloomfield, MI (US); Walter H. Ohrbom, Hartland Township, MI (US); Donald H. Campbell, Hartland, MI (US); Donald L. St. Aubin, Pleasant Ridge, MI (US); Ulrike Röckrath, Senden (DE)

(73) Assignee: BASF Corporation, Southfield, MI (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/957,556

(22) Filed: Oct. 1, 2004

(65) Prior Publication Data

US 2005/0080196 A1 Apr. 14, 2005

Related U.S. Application Data

(63) Continuation-in-part of application No. 10/285,214, filed on Oct. 31, 2002, now abandoned.

(51) Int. Cl.
*C08F 8/28* (2006.01)

(52) U.S. Cl. .............................. 525/328.2; 525/329.5; 525/385; 526/301; 526/304

(58) Field of Classification Search ............. 525/328.2, 525/329.5, 385; 526/301, 304
See application file for complete search history.

(56) References Cited

U.S. PATENT DOCUMENTS

| | | | | |
|---|---|---|---|---|
| 3,479,328 A | * | 11/1969 | Nordstrom | 526/312 |
| 3,784,528 A | * | 1/1974 | Pirck et al. | 525/385 |
| 4,539,286 A | | 9/1985 | Lipson et al. | |
| 4,704,442 A | * | 11/1987 | Just et al. | 526/273 |
| 4,705,885 A | * | 11/1987 | Just et al. | 560/158 |
| 4,946,875 A | * | 8/1990 | Hirsekorn et al. | 522/170 |
| 5,691,419 A | | 11/1997 | Engelke et al. | |
| 6,881,779 B2 | * | 4/2005 | December | 524/548 |

FOREIGN PATENT DOCUMENTS

| | | |
|---|---|---|
| DE | 196 01 330 A1 | 7/1997 |
| DE | 196 29 429 A1 | 1/1998 |
| DE | 102 03 685 A1 | 2/2001 |
| EP | 0 134 691 A2 | 7/1984 |
| EP | 0 316 873 A2 | 11/1988 |
| EP | 1 275 670 A1 | 1/2001 |
| GB | 896 821 | 1/1959 |
| GB | 1 140 516 | 1/1969 |
| WO | WO 03/095507 A1 | 11/2003 |
| WO | WO 2005/047396 A1 | 5/2005 |

* cited by examiner

*Primary Examiner*—Bernard Lipman

(57) ABSTRACT

Disclosed is a method for making nongelled addition polymers, especially carbamate functional additional polymers from linear unsaturated anhydrides. The method comprises reacting an unsaturated linear anhydride with an active hydrogen compound to provide two monomers comprising polymerizable C=C bonds, at least one of said monomers comprising an acid functional group; polymerizing the polymerizable C=C bonds of the two monomers to provide an acid functional polymerization product; and reacting the acid functional polymerization product with an epoxy functional compound to provide a nongelled addition polymer, wherein the disclosed method does not include a step comprising the physical removal of any acid functional monomers or polymerization products. Also disclosed is a curable coating composition containing the resulting carbamate functional polymer, as well as a coated substrate comprising a cured film resulting from the application and curing of the disclosed curable coating composition.

16 Claims, No Drawings

CARBAMATE FUNCTIONAL ADDITION POLYMERS AND METHOD FOR THEIR PREPARATION

CROSS-REFERENCE TO RELATED APPLICATIONS

This application is a continuation-in-part of U.S. patent application Ser. No. 10/285,214, filed Oct. 31, 2002, now abandoned which is incorporated herein by reference.

FIELD OF THE INVENTION

The invention relates to carbamate functional addition polymers, a method of making such a polymer, curable coating compositions incorporating such materials and a coated substrate comprising the applied and cured coating composition.

BACKGROUND OF THE INVENTION

Curable coating compositions, especially thermoset coatings, are widely used in the coatings art. They are often used for topcoats in the automotive and industrial coatings industry.

High-gloss and color-plus-clear composite coatings are particularly useful as topcoats where exceptional gloss, depth of color, distinctness of image, or special metallic effects are desired. The automotive industry has made extensive use of these coatings for automotive body panels. These coatings require an extremely high degree of clarity and a low degree of visual aberrations at the surface of the coating in order to achieve desired visual effects such as a high distinctness of image (DOI).

As a result, high-gloss and composite color-plus-clear coatings are susceptible to a phenomenon known as environmental etch. Environmental etch manifests itself as spots or marks on or in the finish of the coating that often cannot be rubbed out. It can be difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings and color-plus-clear composite coatings.

Many compositions have been proposed for use as the clearcoat portion of color-plus-clear composite coating systems, such as polyurethanes, acid-epoxy systems and the like. However, many prior art systems suffer from disadvantages such as coatability problems, compatibility problems with the pigmented basecoat, and/or solubility problems. Moreover, very few one-pack coating compositions have been found that provide satisfactory resistance to environmental etch, especially in the demanding environment of automotive coatings.

It has been found that carbamate functional polymers such as those described in U.S. Pat. No. 5,356,669 can be used to provide coating compositions which exhibit significantly improved environmental etch resistance. Carbamate functional polymers have been used to provide commercially advantageous coatings compositions, especially as clearcoats in composite color-plus-clear coatings.

One method of producing carbamate-functional materials is by transcarbamylation or transesterification reaction of the hydroxyl-functional material with an alkyl carbamate (e.g., methyl carbamate, ethyl carbamate, or butyl carbamate). The reaction is carried out using a catalyst, such as an organometallic catalyst (e.g., dibutyl tin dilaurate). This method has certain disadvantages, one of which is that the presence of acid poisons the tin catalyst. If the carbamate material is produced by transcarbamylation and acid functionality is desired, then it is necessary to introduce the acid functionality after the transcarbamylation is complete. Another disadvantage is that the transcarbamylation process can require additional, expensive equipment to handle the low molecular weight carbamate compounds that are typically used in the process.

It would be desirable to make a wide variety of carbamate functional polymers from low cost and readily available reactants such as unsaturated linear anhydrides. Unfortunately, prior art methods for making addition polymers from linear unsaturated anhydride starting reactants typically require a purification step with respect to undesirable acid functional compounds resulting from the reaction of anhydride compounds, especially linear unsaturated anhydride compounds. Such purification steps normally involve the physical removal of such acid functional compounds and are often used in regards to monomers obtained from the reaction of an anhydride compound. Alternatively, the use of linear unsaturated anhydride compounds is often limited to processes for making addition polymers having high acid numbers.

SUMMARY OF THE INVENTION

The disclosed method provides a process for making a nongelled addition polymer. In one exemplary embodiment, the nongelled addition polymer is a carbamate functional addition polymer.

The disclosed method comprises reacting an unsaturated linear anhydride with an active hydrogen compound to provide two monomers comprising polymerizable C=C bonds, at least one monomer comprising an acid functional group; polymerizing the polymerizable C=C bonds of the two monomers to provide an acid functional polymerization product; and reacting the acid functional polymerization product with an epoxy functional compound to provide a nongelled addition polymer.

It is an aspect of the disclosed method that it does not include a step comprising the physical removal of any acid functional monomers or polymerization products.

Also disclosed is a curable coating composition containing the resulting carbamate functional polymer, as well as a coated substrate comprising a cured film resulting from the application and curing of the disclosed curable coating composition.

DETAILED DESCRIPTION OF THE PREFERRED EMBODIMENTS

The following description of the preferred embodiment(s) is merely exemplary in nature and is in no way intended to limit the invention, its application, or uses.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

The disclosed method allows for the advantageous use of linear unsaturated anhydrides as a starting reactant in the production of addition polymers, especially carbamate functional addition polymers.

These advantages are obtained by a stepwise reaction process. The initial step of the disclosed process involves reacting an unsaturated linear anhydride with an active hydrogen compound to provide two monomers comprising polymerizable C=C bonds, at least one of these monomers comprising an acid functional group. The resulting monomers containing polymerizable C=C bonds are then polymerized to provide an acid functional polymerization product. Finally, the acid functional polymerization product is reacted with an epoxy functional compound to provide a nongelled addition polymer.

It is an aspect of the invention that the disclosed method does not include a step comprising the physical removal of any acid functional monomers or acid functional polymerization products. In addition, in one embodiment, the disclosed method is a 'one-pot' process, i.e., a process wherein only a single reactor or tank is utilized. In another embodiment, the nongelled addition polymer will be a carbamate functional addition polymer having a low acid number as discussed below.

The linear unsaturated anhydrides suitable for use herein will generally be anhydrides of monocarboxlic acids. In one embodiment, the linear unsaturated anhydride will be of the formula:

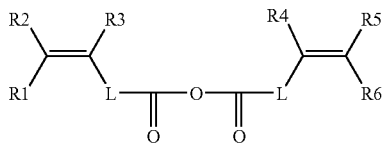

wherein R1 to R6 may be the same or different and each R1, R2, R3, R4, R5, and R6 substituent is at least one of H, an alkyl group of from 1 to 4 carbons, or a cycloaliphatic group of from 1 to 4 carbons, and L is an optional linking group. In one embodiment, groups R1 to R6 can contain a cyclic structure. For example, R1 and R3 may each be the anchoring carbons of a —$CH_2$—$CH_2$—$CH_2$— group that forms a 5 membered ring in combination with the C=C bond. If present, L may be an aliphatic, cycloaliphatic, aromatic, or heterocyclic linking group and may contain one or more heteroatoms such as O, P, Si, N, or combinations thereof.

Illustrative examples of suitable linear unsaturated anhydrides include acrylic anhydride, methacrylic anhydride, methyl methacrylic anhydride, and the like. In one exemplary embodiment, the unsaturated linear anhydride will be methacrylic anhydride.

The unsaturated linear anhydride is reacted with an active hydrogen compound to provide two monomers comprising polymerizable C=C bonds, at least one of these monomers comprising an acid functional group. Suitable active hydrogen compounds will comprise at least one functional group reactable with the anhydride functional group of the unsaturated linear anhydride.

In one embodiment, the active hydrogen compound will be of the formula R-A, wherein A represents an active hydrogen group and R can be aliphatic, cycloaliphatic, aryl, heterocyclic, or a mixture thereof. Illustrative active hydrogen groups A include hydroxyl groups, thio groups, amine groups, and the like. In one embodiment, A will be $XR'_n$, wherein X is O, N, S, or the like, R' may be H or an alkyl group of from 1 to 4 carbons, and n may be from zero to four. In one exemplary embodiment, A will be OH.

In one embodiment, R may comprise one or more heteroatoms such as O, S, Fl, Si, N, or the like. In yet another embodiment, R will comprise an additional functional group Y that is nonreactive with the anhydride group of the linear unsaturated anhydride. Thus, in one embodiment, the active hydrogen compound will be of the formula Y—R-A, wherein R and A are as described above and Y is an optional functional group that is nonreactive with the anhydride group. Illustrative functional groups Y that are nonreactive with the anhydride group include halogens such as fluorine, silane, urea, carbamate, amide, cyclic carbonates, acid groups, carbon-carbon double bonds, groups convertible to a carbamate group or a urea group, combinations thereof, and the like.

In one exemplary embodiment, the active hydrogen compound will comprise one or more additional functional groups Y that are at least one of urea, carbamate, especially primary carbamate groups, groups convertible to a carbamate group or a urea group, or combinations thereof. In one particularly exemplary embodiment, R of the active hydrogen compound having the formula Y—R-A will contain one or more additional functional groups Y that are carbamate, especially primary carbamate groups.

"Carbamate" group as used herein refers to the structure

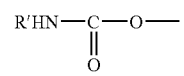

wherein R' is H or alkyl. Preferably, R' is H or alkyl of from 1 to about 4 carbon atoms, and more preferably R' is H (a primary carbamate). The term "secondary carbamate group" is used to refer to a group in which R' is an alkyl group. A terminal urea group may be represented by the structure

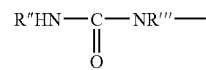

in which R" and R'" are each independently H or alkyl or R" and R'" together form a heterocyclic ring structure. Preferably, R" and R'" are each independently or together form an ethylene bridge, and more preferably R" and R'" are each H (a primary terminal urea).

Groups that can be converted to carbamate groups include cyclic carbonate groups, epoxide groups, and unsaturated bonds. Cyclic carbonate groups can be converted to carbamate groups by reaction with ammonia or a primary amine, which ring-opens the cyclic carbonate to form a beta-hydroxy carbamate. Epoxide groups can be converted to carbainate groups by first converting to a cyclic carbonate group by reaction with $CO_2$. This can be done at any pressure from atmospheric up to supercritical $CO_2$ pressures, but is preferably under elevated pressure (such as 60-150 psi). The temperature for this reaction is preferably kept low enough to substantially prevent reaction of the epoxide group with the free acid liberated from the anhydride. Useful catalysts include any that activate an oxirane ring, such as tertiary amines or quaternary salts like tetramethyl ammonium bromide, combinations of complex organotin halides such as trimethyl tin iodide, tetrabutyl potassium iodide, potassium salts such as potassium iodide and potassium carbonate preferably in combination with crown ethers, tin octoate, calcium octoate, and so on. The cyclic carbonate group can then be converted to a carbamate group as already described. Six-membered cyclic carbonates can be synthesized by reacting phosgene with 1,3-propanediol under appropriate conditions for forming the cyclic carbonate. A cyclic carbonate can also be formed by reacting a 1,2-diol with diethyl carbonate. An unsaturated bond can be converted to a carbamate group by first reacting with peroxide to convert it to an epoxide group, then with $CO_2$ to form a cyclic carbonate, and then with ammonia or a primary amine to form the carbamate group. However, epoxide groups are not preferred, and in one embodiment, as not suitable, as optional functional group Y because of the potential reaction with the acid group from the anhydride.

Groups such as oxazolidone can be converted to terminal urea groups. For example, hydroxyethyl oxazolidone can be reacted with the carboxylic acid anhydride group and then the oxazolidone group on the product can be reacted with ammonia or a primary amine to generate a terminal urea functional group.

Suitable examples of active hydrogen compounds having a carbamate group Y include, without limitation, hydroxyalkyl carbamates including hydroxyethyl carbamate, beta hydroxypropyl carbamate, gamma hydroxyl propyl carbamate, beta hydroxyl butyl carbamate, gamma hydroxyl butyl carbamate, delta hydroxyl butyl carbamate, the beta hydroxyl carbamate prepared from glycidyl neodecanoate, and the reaction products of such hydroxyl carbamates with E-caprolactone;

Suitable examples of active hydrogen compounds having a urea group Y include, without limitation, any amine or hydroxyl functional ureas or cyclic ureas. In one exemplary embodiment, an active hydrogen compound having a urea group as an additional functional group will be HEEU or n-(2-hydroxyethyl)ethyeneurea.

Suitable examples of active hydrogen compounds having a functional group Y that can be converted to a carbamate group or a terminal urea group include, without limitation, glycidol (the epoxide group can be converted to carbonate with CO2, then reacted with ammonia or a primary amine to provide a carbamate group), glycerine carbonate, 3-hydroxypropyl carbonate (the carbonate group of which can be reacted with ammonia or a primary amine to provide a carbamate group), unsaturated alcohols such as hydroxyethyl oxazolidone, allyl alcohol, hydroxyethyl acrylate, and hydroxyethyl methacrylate (the double bond of which can be oxidized to an epoxide group, then converted to a carbamate group as already outlined).

In one exemplary embodiment, the active hydrogen compound will be a hydroxyalkyl carbamate as described above. Hydroxyalkyl carbamates may be produced by reacting ammonia or a primary amine with 4,4,6-trimethyl-1,3-dioxan-2-one (available as XTC-27 from Huntsman) to yield, in the case of ammonia, 3-carbamoyl-3,3,1-trimethyl propanol. Hydroxy carbamates may also be prepared by transcarbamation of a compound containing one primary hydroxyl group and a secondary hydroxyl group, such as 2,4-ethyl-1,5 octanediol. The transcarbamation is specific enough to yield over 90% of the product in which the carbamate has been introduced only at the primary hydroxyl site.

In one embodiment, the active hydrogen compound that is a hydroxyalkyl carbamate will contain up to 15% by weight of an alkylcarbonate precursor before and during the reaction with the linear unsaturated anhydride.

In another embodiment, the active hydrogen compound will be a β-hydroxy carbamate compound. Suitable β-hydroxy carbamate groups have the isomeric structures

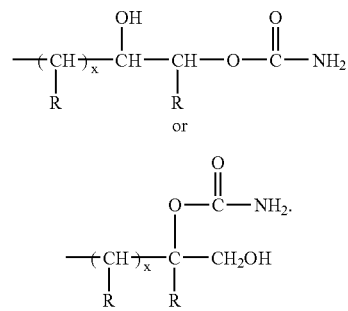

A suitable β-hydroxy carbamate compound may be prepared by reacting a glycidyl-group containing compound first with carbon dioxide to convert the oxirane group to a cyclic carbonate group, and then with ammonia or a primary amine to convert the cyclic carbonate group to a β-hydroxy carbamate group. Examples of suitable oxirane group-containing compounds include, without limitation, glycidyl esters, glycidyl ethers, and epoxides of monoalkenes. The oxirane group is first converted to a cyclic carbonate group by reaction with $CO_2$. This can be done at any pressure from atmospheric up to supercritical $CO_2$ pressures, but is preferably under elevated pressure (e.g., 60-150 psi). The temperature for this reaction is preferably 60-150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group is then reacted with ammonia or a primary amine. The primary amine preferably has up to four carbons, e.g. methyl amine. Preferably, the cyclic carbonate is reacted with ammonia. The ammonia may be aqueous ammonia (i.e., $NH_4OH$).

A β-hydroxy carbamate compound may also be prepared by reacting a cyclic carbonate-containing compound with ammonia or a primary amine to convert the cyclic carbonate group to a β-hydroxy carbamate group.

Suitable gamma hydroxyl carbamate compounds may be prepared with the use of starting materials comprising two or more cyclic carbonate groups (bi) and of the structure:

$$\left[ \begin{array}{c} O \\ \| \\ O \diagup \diagdown O \\ | \quad \quad | \\ C \diagdown \diagup C \\ (C)_n \end{array} \right]_q$$
$$P$$

wherein n is 1, q is a number from 2 to 50, and P is a hydrocarbon based material selected from the group consisting of compounds, oligomers, and polymers having more than 6 carbon atoms, and reacting the at least one cyclic carbonate fuinctional group (bi) with ammonia to provide a gamma hydroxy primary carbamate group of the structure:

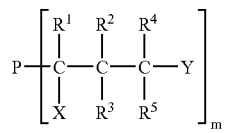

wherein X and Y are either a primary carbamate group or a hydroxyl group but may not be the same, m is a number from 2 to 50, $R^1$, $R^2$, $R^3$, $R^4$, and $R^5$ are each at least one of H, an alkl group, a heteroatom containing group, or mixtures thereof, and P is at least one hydrocarbon based member selected from a compound, or an oligomer or polymer having more than 6 carbon atoms.

In another embodiment, suitable gamma hydroxy primary carbamate functional compounds may be made by reacting a compound (a) and a compound (b), wherein compound (a) will generally be one of the structures:

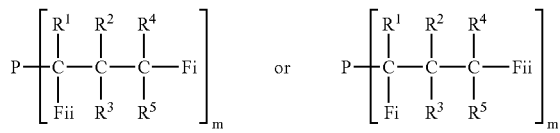

wherein all variable are as described above and functional groups Fi and Fii are separated by at least three carbon atoms, wherein said functional groups Fi and Fii are independently selected from the group consisting of functional groups convertible to primary carbamate groups. Preferred examples of functional groups $F_i$ and $F_{ii}$ convertible to primary carbamate groups are hydroxy groups and halide groups. Suitable halide groups include chloride, bromide, and iodide, with chloride being the most favored halide. Most preferably, functional groups Fi and Fii will be hydroxyl groups. Suitable compounds (a) may include polyols, diols, polyhalides, and dihalides. However, the use of diols and dihalides as compound (a) is especially preferred as they are the most commercially available and economically feasible. Diols are most preferred for use as compound (a).

The selection of compound (b) is somewhat dependent upon the selection of functional groups $F_i$ and $F_{ii}$ of compound (a). In general, if functional group (i) is a hydroxyl group, it will be converted into a primary carbamate by reaction with a compound (b) selected from the group consisting of alkyl carbamates, cycloalkyl carbamates, ether carbamates, beta hydroxy alkyl carbamates, aryl carbamates, cyanic acid produced, for example, by the decomposition of urea, and phosgene followed by reaction with ammonia. If functional group (i) is a halide group, it may be converted into a primary carbamate group by reaction with a metal carbamate such as silver carbamate.

Other examples of suitable active hydrogen compounds include cyclic carbonates, functional and nonfunctional Si containing compounds, unsaturated alcohols that are nonreactable under the polymerization conditions, halogenated alcohols, and the like.

Illustrative cyclic carbonates that are suitable for use as the active hydrogen compound include cyclic five to eight member cyclic carbonates that have pendant hydroxyl groups. Suitable examples include all hydroxyalkyl 1,3-dioxolan-2-ones such as glycerin carbonate, and all hydroxyalkyl-1,3-dioxan-2-ones such as 4-hydroxymethyl 1,3-dioxan-2-one.

Suitable functional Si-containing compounds include compounds that contain either an alkoxy group or an acid ester attached to a Si atom as the Y portion of the active hydrogen compound of the formula Y—R-A. Nonfunctional Si-containing compounds include compounds wherein the Si atom is connected to either a Si—O group or Si—R" group, wherein R" is an alkyl, cycloalkyl, or aromatic group. In this case, the A portion of the active hydrogen compound may be a hydroxyl alkyl group or an amino alkyl group. Illustrative examples of suitable Si-containing active hydrogen compounds include 3-triethoxysilylpropylamine (functional Si-containing compound) and nonfunctional Si-containing compounds such as trimethylsilylpropanol and pentamethylcyclotrisiloxane propanol.

Suitable unsaturated alcohols include allyl alcohol, while illustrative halogenated alcohols include fluoroalcohols such as 2-perfluorobutylethyl alcohol. In this case, the hydroxyl group is A while the fluorine atoms are Y.

The active hydrogen compound is reacted with the linear unsaturated anhydride to provide two monomers comprising polymerizable C=C bonds, at least one of these monomers comprising an acid functional group. Preferably, the reaction temperature is from about 50° C. to about 120° C. A base catalyst may be included, such as dimethyl dodecyl amine or dimethyl amino pyridine.

In one embodiment, an excess of the active hydrogen compound is reacted with the linear unsaturated anhydride. The excess, unreacted active hydrogen compound may then be reacted with a polyisocyanate compound as described in Rehfuss, Ohrbom, St. Aubin and Taylor, U.S. Pat. No. 5,719,237.

The reaction of the active hydrogen compound with the linear unsaturated anhydride results in the cleavage or breaking of the anhydride into two monomers containing unsaturation, i.e., at least one carbon-carbon double bond polymerizable under addition polymerization conditions. In one embodiment, at least one of the two monomers will comprise a carboxylic acid functional group. In another embodiment, at least one other unsaturated monomer will comprise a residue (Y—R—) resulting from the reaction of the active hydrogen compound Y—R-A with the unsaturated linear anhydride. In one exemplary embodiment, the reaction product resulting from the reaction of the active hydrogen compound Y—R-A with the unsaturated linear anhydride will comprise at least two monomers having polymerizable carbon-carbon doubles, at least one of which comprises a carboxylic acid functional group and another that comprises a residue (Y—R—) resulting from the reaction of the active hydrogen compound Y—R-A with the unsaturated linear anhydride.

The at least two unsaturated monomers resulting from the reaction of the unsaturated linear anhydride with the active hydrogen compound will be polymerized to provide an acid functional polymerization product.

The term "polymerization product" as used herein refers to both oligomers and polymers. The term "polymer" as used herein refers to materials having at least ten repeating units, more preferably greater than 10 repeating units. The term "repeating units" as defined as herein refers to groups of atoms that are the reaction product result or residue of the reaction of two or more monomers. Such repeating units may have an individual number average molecular weight in the range of about 28 to about 750 Daltons. The term "oligomer" as used herein refers to materials having from two to nine repeating units or mixtures of repeating units. Oligomers may have may have number average molecular weights in the range of about 202 to about 1499 Daltons. It will be appreciated by those of skill in the art that because oligomers and polymers are both based on repeating units of monomeric materials; high molecular weight oligomers may overlap the low molecular weight end range for polymers.

The at least two unsaturated monomers may be optionally copolymerized with any of a number of possible comonomers. Suitable comonomers include, for example and without any limitation, alkylene hydrocarbons such as ethylene, propylene butylene, and octene; aromatic hydrocarbon vinyl compounds such as styrene and alpha-methyl styrene; vinyl ester monomers such as vinyl acetate; (meth)acrylic monomers such as methyl (meth)acrylate, ethyl (meth)acrylate, propyl (meth)acrylate, n-butyl (meth)acrylate, t-butyl (meth) acrylate, isobutyl (meth)acrylate; 2-ethylhexyl (meth)acrylate, cyclohexyl (meth)acrylate, and so on; and combinations of these. In one embodiment, optional comonomers will be used in the polymerization of the two unsaturated monomers resulting from the reaction of the unsaturated linear anhydride with the active hydrogen compound. In one embodiment, optional comonomers may be methyl methacrylate.

The polymerization may be carried out by any of the usual addition polymerization methods, including bulk polymerization, solution polymerization, and emulsion polymerization. Suitable methods for polymerizing the polymerizable carbon-carbon double bonds of the two monomers resulting from the reaction of the unsaturated linear anhydride with the active hydrogen compound include free radical polymerization methods including UV and/or thermally initiated processes, ionic polymerization methods including anionic or cationic processes, and controlled or living polymerization reactions such as ATRP, RAT polymerization methods and the like.

As used herein, 'polymerization' refers to oligomerization or polymerization reaction conditions wherein the temperature is between room temperature (approximately 20° C./68° F.) and no more than 180° C./356° F., more preferably from 70 to 140° C./158 to 284° F., and most preferably from 110 to 140° C./230 to 284° F.

In one embodiment of the disclosed method, polymerization as used herein refers to reaction conditions that are free of any catalysts that can activate an oxirane group. Illustrative examples of such oxirane activating catalysts are tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) in combination with crown ethers, tin octoate, calcium octoate, and the like.

The most preferred polymerization techniques are free radical polymerizations that may take place in solvent or water but will most preferably take place in solvent. Illustrative examples of suitable organic solvents include aromatic solvents, ketone solvents, ester solvents, ether solvents, alcoholic solvents, and combinations thereof. In a preferred embodiment of the invention, free radical polymerization reaction conditions will be used which are free of catalysts such as Lewis acids and strong sulphonic acids having a pKa of less than 2.0.

In one preferred embodiment, free radical polymerization of the two unsaturated monomers will take place in the presence of temperatures of about 80 to 140° C. in the absence of any epoxy ring activating catalysts, and an absence of any water or alcohols that are reactive with any optional functional groups Y under such temperatures.

Alternatively, the monomers may be polymerized using controlled or living radical polymerization processes as described by Matyjaszewski and Krysztof in Chem. Reviews, Vol. 101 pg 2921-2990 (2001), or by iniferter process as described by Kuchanov, in J. of Polymer Science, Part A: Polymer Chemistry Vol 32 pg 1557-1568 (1994), and Gaofenzi Xuebao Vol 2 pg 127-136 (2002), nitroxide-mediated polymerization as described by Zaremski, in Russian Polymer News Vol 4 pg 17-21 (1999), and Wang, in Abstracts of Papers, 224th ACS National Meeting, Boston, Mass., United States, Aug. 18-22, 2002 (2002), all of which are incorporated by reference herein.

In one embodiment, the polymerization of the two unsaturated monomers resulting from the reaction of the unsaturated linear anhydride with the active hydrogen compound will occur after the ring opening of the linear unsaturated anhydride. In one embodiment, polymerization will not occur until at least 50% of the reaction between the linear unsaturated anhydride and the active hydrogen compound has gone to completion, i.e., until at least 50% of the anhydride groups on the linear unsaturated anhydride have been ring opened by the active hydrogen compound. In another embodiment, polymerization will not commence until at least 80% of the reaction between the linear unsaturated anhydride and the active hydrogen compound has gone to completion. In another embodiment, polymerization will not commence until an IR peak measuring the presence of the anhydride ring disappears.

The polymerization of the two unsaturated monomers resulting from the reaction of the unsaturated linear anhydride with the active hydrogen compound will result in a polymerization reaction product comprising an acid functional group resulting from the reaction of the linear unsaturated anhydride. In one embodiment, the acid functional polymerization product will also comprise a residue (Y—R—) resulting from the reaction of the active hydrogen compound Y—R-A with the unsaturated linear anhydride. In one exemplary embodiment, the acid functional polymerization product will comprise a carbamate group or a group convertible to a carbamate or urea group.

The acid functional polymerization product is reacted with an epoxy functional compound. In one embodiment, the epoxy functional compound will be a monoepoxide compound. In one embodiment, the epoxide functional compound will be of the formula R-Z, wherein R is defined as above with respect to the active hydrogen compound and Z is an epoxy group.

In another embodiment, suitable epoxy functional compounds may be selected from, for example and without limitation, glycidyl esters, glycidyl ethers, and epoxides of alkenes. In one preferred embodiment, the epoxide is a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. Glycidyl esters such as Cardura® E are commercially available. The acid portion of the glycidyl ester may have up to about 40 carbon atoms, preferably up to about 20 carbon atoms, and more preferably up to about 12 carbon atoms. In one exemplary embodiment, the epoxy functional compound will be a glycidyl ester of neodecanoate acid. In one particularly exemplary embodiment, the epoxy functional compound will be a glycidyl ester such as Cardura® E.

Suitable glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like.

Epoxides may also be prepared by reacting a compound containing a double bond with peroxide or peracetic acid. Useful double bond-containing compounds include, without limitation, cycloaliphatic monounsaturated compounds such as cyclohexene and substituted cyclohexenes, ethylene, propylene, styrene, styrene oxide, and the like.

The acid functional polymerization product and the epoxy functional compound are reacted together under appropriate conditions. Suitable reaction temperatures will typically be from about 50° C. to about 150° C., and a base catalyst may be included, such as dimethyl dodecyl amine or dimethyl amino pyridine.

Not all of the carboxylic acid groups need be reacted with the monoepoxide compound. In one embodiment, the resulting addition polymer will have substantially no acid groups resulting from the reaction of the linear unsaturated anhydride. In another embodiment, only a portion of the acid groups will be reacted with the epoxy functional compound to produce an addition polymer that has a low number of acid groups resulting from the reaction of the linear unsaturated anhydride. That is, in some instances it may desirable to prepare an addition polymer having a given acid number due to residual carboxylic acid groups from the cleavage of the linear unsaturated anhydride. In one embodiment, the addition polymer resulting from the disclosed method will have an acid number that corresponds to 20% or less of the optional functional group Y, especially when Y is a primary carbamate group. In one embodiment, the addition polymer resulting from the disclosed method will have an acid number that corresponds to 10% or less of the primary carbamate groups, while in another embodiment, the addition polymer resulting from the disclosed method will have an acid number that corresponds to 7% or less of the primary carbamate groups.

It is an aspect of the disclosed process in one embodiment that it does not include any steps comprising the physical removal of acid functional monomers or acid functional polymerization products. Physical removal as used herein refers to processes or steps such as stripping, distillation, or the like. Rather, in one embodiment, it is a basic and material aspect of the disclosed method that the amount of acid functional monomers or polymerization products are controlled by the disclosed steps of the process, i.e., reacting an unsaturated linear anhydride with an active hydrogen compound to provide two monomers comprising polymerizable C=C bonds, at least one monomer comprising an acid functional group, polymerizing the polymerizable C=C bonds of the two monomers to provide an acid functional polymerization product, and reacting the acid functional polymerization product with an epoxy functional compound to provide a nongelled addition polymer.

Also provided herein are curable coating compositions comprising the disclosed nongelled addition polymers, especially the disclosed carbamate functional addition polymers. In one embodiment, such curable coating compositions may comprise such polymers in an amount of from 1 to 99% by weight of nonvolatile vehicle as defined below. In another embodiment, such curable coating compositions may comprise such polymers in an amount of from 30 to 80% by weight of nonvolatile vehicle as defined below.

The coating composition may include further carbamate-functional compounds. Such carbamate-functional compounds include, without limitation, any of those described in U.S. Pat. Nos. 6,160,058, 6,084,038, 6,080,825, 5,994,479, the disclosures of which are incorporated by reference.

The coating composition further includes one or more crosslinkers reactive with active hydrogen groups. Particularly useful crosslinkers include, without limitation, materials having active methylol or methylalkoxy groups, such as aminoplast crosslinking agents or phenol/formaldehyde adducts. Examples of preferred curing agent compounds include melamine formaldehyde crosslinkers, including monomeric or polymeric melamine resin and partially or fully alkylated melarnine resin, urea resins, and methylol ureas such as urea formaldehyde resin, alkoxy ureas such as butylated urea formaldehyde resin. Other useful crosslinkers include, without limitation, polyisocyanates and blocked polyisocyanates. The curing agent may be combinations of these. Aminoplast resins such as melamine formaldehyde resins or urea formaldehyde resins are especially preferred.

In preferred embodiments, the crosslinker is at least about 5%, more preferably at least about 10% by weight of the nonvolatile vehicle. "Nonvolatile vehicle" refers to the film-forming components. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The coating composition may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzene-sulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent or solvents may be utilized in the coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

When the coating composition is a primer composition or pigmented topcoat composition, such as a basecoat composition, one or more pigments and/or fillers may be included. Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Additional agents, for example hindered amine light stabilizers, ultraviolet light absorbers, anti-oxidants, surfactants, stabilizers, wetting agents, rheology control agents, dispersing agents, adhesion promoters, etc. may be incorporated into the coating composition. Such additives are well-known and may be included in amounts typically used for coating compositions.

Coating compositions can be coated on the article by any of a number of techniques well-known in the art. These include, for example, spray coating, dip coating, roll coating, curtain coating, and the like. For automotive body panels, spray coating is preferred.

The coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

Application can be, for example, by electrostatic spraying or by use of a fluidized bed. Electrostatic spraying is the preferred method. The coating composition can be applied in one or more passes to provide a film thickness after cure of typically from about 20 to about 100 microns.

After application of the coating composition to the substrate, the coating is cured, preferably by heating at a temperature and for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes. Heating can be done in infrared and/or convection ovens.

The coating composition is preferably utilized as the clearcoat of an automotive composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the crosslinking agents, however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15-25 minutes for blocked acid catalyzed systems and 10-20 minutes for unblocked acid catalyzed systems. The curing times may also be expressed as time after metal temperature reaches the bake temperature ("metal temperature"). For example, the curing time may be for 5 to 30 minutes, preferably 10 to 20 minutes, at metal temperature.

The invention is further described in the following example. The examples are merely illustrative and do not in any way limit the scope of the invention as described and claimed. All parts are parts by weight unless otherwise noted.

EXAMPLE 1

Preparation of a Carbamate Functional Polymer According to the Disclosed Method.

A suitable flask was charged with 532 grams methacrylic anhydride, 341 grams hydroxyethyl carbamate (CarboLink HEC supplied by Huntsman), 1.5 grams triphenyl phosphite and 2.6 grams 2,6-di t-butylmethyl phenol. The mixture was heated to 105° C. and held until an anhydride IR peak at 1750 cm−1 disappeared.

A suitable flask was charged with 211 grams of the monopropyl ether of propylene glycol (Propyl Propasol), 100 grams monomethyl ether of propylene glycol and 378.3 grams Cardura E (supplied by Shell) under a nitrogen blanket. The mixture was heated to 130° C. 425 grams of the CEMA/MAA mixture above, 65.5 grams 2,2'-azobis(2 methylbutyronitrile) (Vazo 67 supplied by DuPont) and 122.2 grams monomethyl ether of propylene glycol was added to the flask over three hours. When addition was complete, the resulting polymerization product was cooled to 120° C. To the cooled resin was added 7.7 grams 2,2'-azobis(2 methylbutyronitrile) (Vazo 67 supplied by DuPont), 21.3 grams methyl methacrylate and 50 grams monomethyl ether of propylene glycol over thirty minutes. When this addition was complete, the following were added to the flask over thirty minutes: 3.9 grams 2,2'-azobis(2 methylbutyronitrile) (Vazo 67 supplied by DuPont and 25 grams monomethyl ether of propylene glycol. When this addition was complete, the resin was heated to 140° C. and held until the epoxy group was no longer detectable by titration. The resulting resin was then cooled to 80° C. and poured off.

The disclosed method is advantageous in that it provides a process that uses linear unsaturated anhydrides as a starting material. The disclosed process provides a way to avoid the gellation problems typically encountered with prior art processes employing linear unsaturated anhydrides. In addition, the disclosed method is advantageous because it is free of costly purification steps with respect to acid functional monomers or polymerization products resulting from the reaction of the anhydride. The method is further advantageous in that it simultaneously provides a process that allows for variations in the desired amount of acid functionality on an addition polymer, including the production of nongelled addition polymers having low acid functionality. Finally, another advantage of the disclosed method is that it allows for the utilization of the one-half of the linear unsaturated anhydride starting material that was previously wasted by prior art processes.

What is claimed is:

1. A method of making a nongelled addition polymer, comprising reacting an unsaturated linear anhydride with an active hydrogen compound to provide two monomers comprising polymerizable C=C bonds, at least one monomer comprising an acid functional group, polymerizing the polymerizable C=C bonds of the two monomers to provide an acid functional polymerization product, and reacting the acid functional polymerization product with an epoxy functional compound to provide a nongelled addition polymer, wherein the method does not include a step comprising the physical removal of any acid functional monomers or polymerization products.

2. The method of claim 1 wherein the nongelled addition polymer is substantially free of the monomer comprising the acid functional group.

3. The method of claim 1 wherein the nongelled addition polymer comprises a one or more functional groups that are at least one of hydroxyl groups, ester groups, primary carbamate groups, terminal urea groups, or a combination thereof.

4. The method of claim 3 wherein the nongelled addition polymer comprises primary carbamate groups.

5. The method of claim 4 wherein the nongelled addition polymer comprises acid functional groups in an amount that corresponds to 20% or less of the primary carbamate groups.

6. The method of claim 1 wherein the unsaturated linear anhydride is of the formula

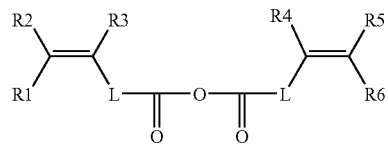

wherein R1 to R6 may be the same or different and are at least one of H, an alkyl group of from 1 to 4 carbons, a cycloaliphatic group of from 1 to 4 carbons, or a mixture thereof, and L is an optional aliphatic, cycloaliphatic, aromatic, or heterocyclic linking group.

7. The method of claim 6 wherein L is present and further comprises at least one of O, P, Si, N, or combinations thereof.

8. The method of claim 1 wherein the unsaturated linear anhydride is methacrylic anhydride.

9. The method of claim 1 wherein the active hydrogen compound is of the formula Y—R-A, wherein A represents an active hydrogen group, R can be aliphatic, cycloaliphatic, aryl, heterocyclic, or a mixture thereof, and Y is a functional group that is nonreactive with the anhydride group of the linear unsaturated anhydride.

10. The method of claim 9 wherein A is at least one of hydroxyl groups, thio groups, or amine groups.

11. The method of claim 9 wherein A is $XR'_n$, wherein X is O, N, S, or the like, R' is H or an alkyl group of from 1 to 4 carbons, and n is from zero to four.

12. The method of claim 11 wherein A is OH.

13. The method of claim 9 wherein R may comprises at least one of O, S, Fl, Si, N, or combinations thereof.

14. The method of claim 9 wherein functional group Y is at least one of fluorine, silane, urea, carbamate, amide, cyclic carbonates, acid groups, carbon-carbon double bonds, groups convertible to a carbamate group or a urea group, or combinations thereof.

15. The method of claim 1 wherein the active hydrogen compound is at least one of hydroxyalkyl carbamates, beta hydroxyalkyl carbamates, gamma hydroxyl alkyl carbamates, beta hydroxyl butyl carbamate, gamma hydroxyl butyl carbamate, delta hydroxyl butyl carbamate, the reaction products of hydroxylalkyl carbamates with E-caprolactone, or combinations thereof.

16. The method of claim 1 wherein the epoxy functional compound is the glycidyl ester of neodecanoate acid.

* * * * *